United States Patent [19]

Beer et al.

[11] Patent Number: 4,827,788
[45] Date of Patent: May 9, 1989

[54] RACK AND PINION STEERING GEAR

[75] Inventors: Wilhelm Beer; Eugen Monetha, both of Russelsheim, Fed. Rep. of Germany

[73] Assignee: General Motors Corporation, Detroit, Mich.

[21] Appl. No.: 82,491

[22] Filed: Aug. 7, 1987

[30] Foreign Application Priority Data

Oct. 1, 1986 [DE] Fed. Rep. of Germany ....... 3633336

[51] Int. Cl.$^4$ ............................................. B62D 3/12
[52] U.S. Cl. ........................................ 74/422; 74/498; 280/96
[58] Field of Search ...................... 74/422, 498; 280/96

[56] References Cited

U.S. PATENT DOCUMENTS

| | | | |
|---|---|---|---|
| 3,157,061 | 11/1964 | Parker | 74/422 |
| 3,554,048 | 7/1969 | Adams | 74/422 |
| 3,623,379 | 8/1969 | Bradshaw et al. | 74/498 |
| 3,777,589 | 12/1973 | Adams | 74/498 |
| 3,864,989 | 2/1975 | Jones | 74/498 |
| 4,008,627 | 2/1977 | Bradshaw et al. | 74/498 |

FOREIGN PATENT DOCUMENTS

| | | | |
|---|---|---|---|
| 1186005 | 8/1959 | France | 74/422 |
| 2154299 | 9/1985 | United Kingdom | 74/422 |

*Primary Examiner*—Leslie A. Braun
*Assistant Examiner*—Scott Anchell
*Attorney, Agent, or Firm*—Saul Schwartz

[57] ABSTRACT

A rack and pinion steering system, particularly for motor vehicles, has a rack placed in an axially displaceable manner in a sealed housing and a pinion which can be driven by the steering wheel, which is placed rotatably in a steering gear housing which also serves to guide the rack in the region thereof which is engaged with the pinion at any given time. The end of the rack away from the pinion is guided by an additional bearing secured to the body or to a part attached to the body. A bellows extending between the steering gear housing, which is shortened in the axial direction of the rack, and the additional mounting, serves as the sealing housing.

2 Claims, 2 Drawing Sheets

RACK AND PINION STEERING GEAR

BACKGROUND OF THE INVENTION

1. Field of the Invention

The invention refers to a rack and pinion steering system, especially for motor vehicles, with a rack placed in an axially displaceable manner in a sealed housing and with a pinion which can be driven by the steering wheel and which is placed rotatably in a steering gear housing which also serves to guide the rack in the region thereof which is engaged with the pinion at any given time.

2. Description of the Prior Art

In known rack and pinion steering systems of the type described above, the steering gear housing serves not only to mount the pinion actuated by the steering shaft, but additionally acts as mount, guide and vehicle-side support for the rack. The relatively large axial extent of the rack, due to design and operational considerations, results in a correspondingly large and heavy steering gear housing. The is especially contributed to by the part serving to guide the rack (also referred to as the "rack tube"), which thus causes the steering gear housing to have a generally "long" appearance. The complete steering gear housing is bolted onto the vehicle body (e.g., to the vehicle's axle carrier).

Examples of this known state of the art include DE-PS 23 36 572, DE-OS 29 34 922, DE-GM 82 03 943 and DE-S 1,215,011. DE-AS 27 48 092 should also be mentioned with regard to attachment of a steering gear housing to the vehicle body. "Long" steering gear housings known in the art are not only high in weight, but chiefly, require complex, time-consuming and costly machining and are moreover not easy to assemble.

SUMMARY OF THE INVENTION

The purpose upon which the invention is based therefore consists of providing for a reduction in weight, a decrease in the amount of machining and easier assembly. This purpose is fulfilled, in a rack and pinion steering system of the type initially described, by the fact that the rack is guided, at its end opposite the pinion, by an additional mounting attached to the body or to a part affixed to the body, and that a bellows extending between the steering gear housing, which is reduced in length in the axial direction of the rack, and the additional mounting, serves as the sealing housing.

The basic idea of the invention therefore consists of the use of other components of the vehicle (axle shaft, subframe, dashboard cowl, etc.) to guide the rack, making the present "rack tube" superfluous as a part of the steering gear housing. This results, in an advantageous manner, in an extremely short steering gear housing which is correspondingly light in weight, easy to machine and therefore involves little cost.

Another significant advantage of the invention is the fact that in terms of design, it is consistent with modern modular construction (assembling the complete vehicle from preassembled units), i.e. it allows installation of the rack and pinion steering system as a preassembled unit. In one advantageous embodiment of the basic idea of the invention, it is therefore recommended that the shortened steering gear and the additional mounting be preassembled on a common component carrier that can be attached to the vehicle body as a module. This makes it easier than it was before to achieve the well-known installation tolerances for vehicle steering systems to be low.

Furthermore, the invention can be configured, in a way which is advantageous in the foregoing manner, so that the shortened steering gear housing has, for the purpose of securing it to the vehicle body with bolts, a round hole and an elongated hole staggered roughly diagonally with respect to the round hole. The elongated hole compensates for the tolerances in hole distance, but always guarantees optimum positional tolerance between the steering gear and the "guide components" (axle shaft, dashboard cowl, etc.).

According to one preferred embodiment of the invention, the additional mounting consists of a guide bush directly surrounding the rack, a bearing collar surrounding the guide bush and a retaining clip overlapping the bearing collar in the manner of a pipe clamp, with the retaining clip serving to secure the additional mounting to the body or to a part attached to the body. The additional mounting can simultaneously serve to secure the bellows at one end, with the bellows preferably being clamped between the guide bush and the bearing collar. The main function of the bellows according to the invention, which can, for example, be configured as a concertina bellows, is to bridge the gap between the steering gear housing in its shortened configuration and the additional bearing mounting in a sealed manner so to exclude dirt.

Further advantageous details and configurations of the invention may be deduced from the subsidiary claims.

The invention is illustrated and explained in more detail, with reference to examples of embodiments, in the drawing and the following description. The drawings show:

BRIEF DESCRIPTION OF THE DRAWINGS

FIG. 3 is a schematic cross-sectional illustration (along line 3—3 in FIG. 1) of an additional mounting for guiding the rack.

DESCRIPTION OF A PREFERRED EMBODIMENT

Figure 1:
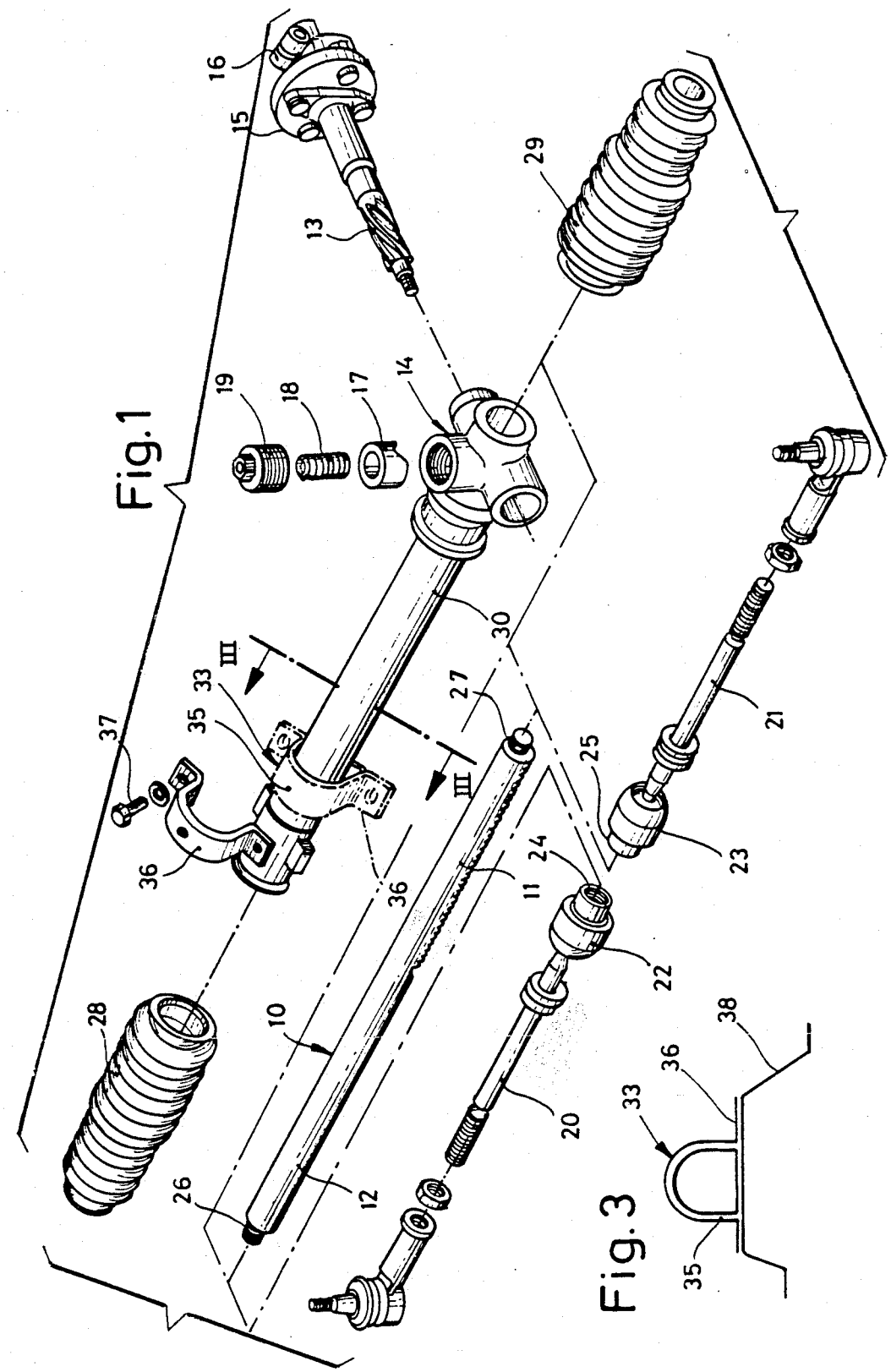
FIG. 1 is an exploded view of a rack and pinion steering system for motor vehicles seen in perspective in an oblique front view.

In the rack and pinion system for a motor vehicle shown in its entirety in FIG. 1, 10 designates a rack which can move axially back and forth. However, the rack 10 has oblique teeth 11 only at one end, extending approximately to the middle, while the remaining region of the rack (labeled 12) is smooth. As FIG. 1 also shows, the teeth 11 on the rack 10 are operationally connected with a pinion 13 which is mounted in a steering gearing housing 14 and is actuated, by means of a shock-absorbing elastic coupling member 15, by a steering shaft (not shown). When the steering system is assembled, the steering shaft is connected through a connector 16 with the elastic coupling member 15 and therefore with the pinion 13. The steering shaft and therefore the pinion 13 are caused to rotate by the rotary torque (steering torque) exerted by the driver on the steering wheel, in a manner which is usual and therefore not shown in more detail. As FIG. 1 further illustrates the required contact pressure between the teeth 11 on the rack 10 and the pinion 13 is exerted by a pressure part 17, which acts on the back surface of the rack 10 facing away from the teeth 11. The rear part of the pressure part 17 itself is acted upon by a compression spring 18, whose back end presses against an adjustable threaded bush 19 threaded into the steering bearing housing 14.

In addition, FIG. 1 shows the tie rod of the steering system. It is configured as a so-called split tie rod and thus consists of two parts 20 and 21. The two tie rod links 20, 21 each have, at the ends facing one another, a ball joint 22, 23 with a threaded sleeve 24, 25. The rack has at each end a corresponding threaded stud 26, 27, which, when the steering system is assembled, is threaded into the corresponding ball joint 22, 23 of the appropriate tie rod link 20, 21. Concertina bellows 28, 29 serve to seal the two tie rod links 20, 21 and the ends of the rack (cf. FIG. 2) on the outside.

Figure 2:
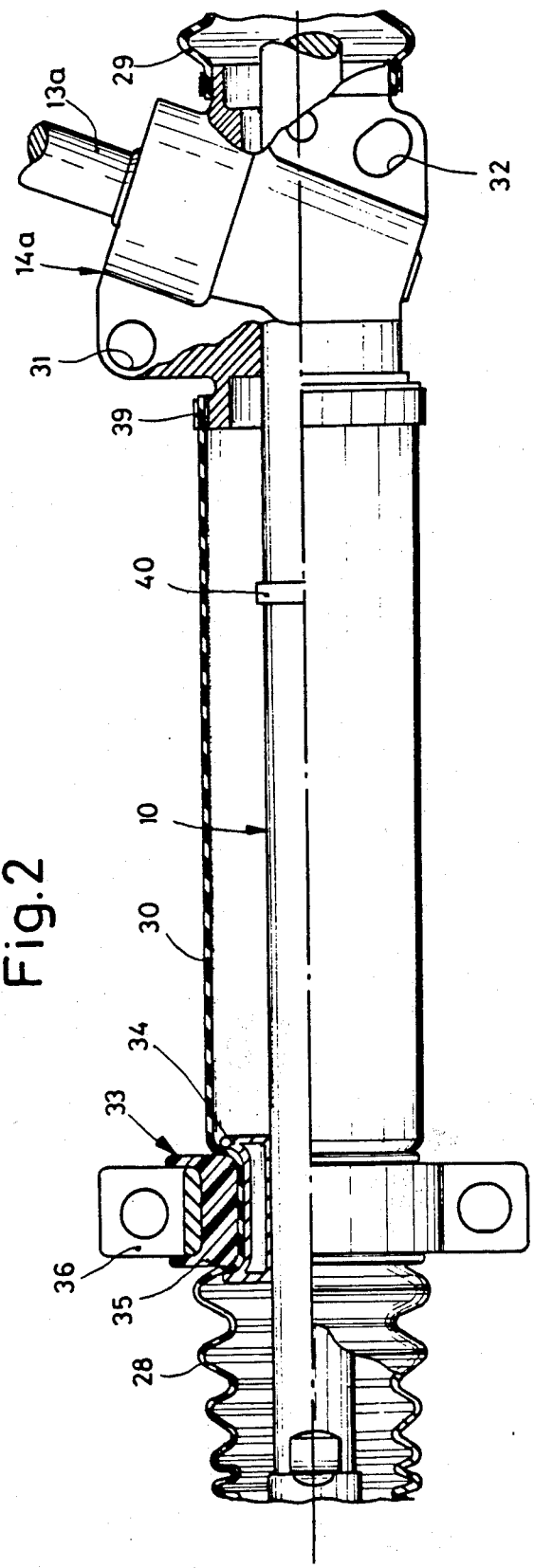
FIG. 2 is an embodiment of a rack and pinion steering system slightly different from that in FIG. 1, partially in front view and partially in horizontal lengthwise section.

As FIG. 2 shows in particular, the rack 10 is also surrounded in a sealed manner by a flaccid bellows, labeled 30. The bellows, like the concertina bellows 28, 29, can be made of elastomer or plastic and has only enough rigidity to hold its own shape. In the embodiments according to FIG. 2, the bellows 30 is made as a unit with the concertina bellows 28. In addition, in contrast to the embodiments shown in FIGS. 1 and 2, it can also itself be configured as a concertina bellows.

The embodiment according to FIG. 2 additionally differs from the embodiment according to FIG. 1 in the configuration of the steering gear housing, which is labeled 14a in FIG. 2. For attachment to the vehicle body or to a part that is or can be affixed to the vehicle body (e.g. the axle shaft, subframe, dashboard cowl and similar parts), it has two through bolt holes 31, 32 staggered diagonally with respect to one another, one of which (31) is configured as a round hole and the other (32) as an elongated hole. The elongated hole compensates for tolerances in spacing between the two holes 31, 32 but always ensures an optimum positional tolerance between the steering gear housing 14a and the part secured to the vehicle (not shown), axle shaft, dashboard cowl, etc., to which the steering gear housing 14a is secured.

As the foregoing embodiments and FIGS. 1 and 2 also demonstrate, the region of the rack 10 on the side of the steering gear is retained and guided by the steering gear housing 14 or 14a. To guide and retain the rack 10 at its end opposite the steering gear, however, an additional bearing is provided, which is given the overall designation 33. As may especially be seen from FIG. 2, the additional mounting 33 consists of a guide bush 34 directly surrounding the rack 10, a bearing collar 35 surrounding the guide bush 34 and a retainer clip overlapping the bearing collar 35 in the manner of a pipe clamp. The guide bush 34 can be made of sintered metal or plastic or any other suitable, technically equivalent material. An elastomer with a comparatively high Shore value should, however, be used as the material for the bearing collar 35. The retainer clip 36 serves to secure the additional mounting 33 by means of bolts 37 (cf. FIG. 1) to the vehicle body or to a part solidly secured thereto, e.g., to the axle shaft schematically indicated in FIG. 3 and labeled 38. Alternatively, however, the additional mounting 33 can also be secured to other parts (not shown) attached to the vehicle, for example, to the subframe or to the dashboard cowl of the chassis.

As FIG. 2 also illustrates, the additional mounting 33 simultaneously serves to secure the bellows 30 at one end, with the bellows 30 being clamped between the guide bush 34 and the bearing collar 35. The end of the bellows 30 towards the steering gear is attached to the steering gear housing 14a at 39.

FIG. 2 furthermore shows that placed on the rack 10 is a steering stop 40, which serves to limit the travel of the rack in one direction. In the other direction, the steering gear housing 14a fulfills this function.

The embodiments of the invention in which an exclusive property or privilege is claimed are defined as follows:

1. A rack and pinion steering gear comprising:
   a steering gear housing adapted for rigid attachment to a vehicle body,
   a pinion shaft rotatably mounted on said steering gear housing including pinion gear teeth at an end thereof within said housing,
   an elongated cylindrical steering rack having a plurality of rack teeth thereon extending over a first portion of the length of said steering rack and an uninterrupted outside cylindrical wall extending over a second portion of the length of said steering rack,
   said steering rack extending through said steering gear housing with said rack teeth meshing with said pinion gear teeth whereby rotation of said pinion shaft effects translation of said steering rack relative to said steering gear housing in the lengthwise direction of said steering rack,
   bearing means on said steering gear housing engaging said steering rack on the opposite side thereof from said rack teeth and defining a bearing between said steering rack and said steering gear housing for said first portion of said steering rack,
   a bearing unit for slidably supporting said second portion of said steering rack on said vehicle body structurally independently of said steering gear housing including a guide bush engaging said steering rack on said outside cylindrical wall of said second portion of said steering rack and an elastomeric bearing collar surrounding said guide bush and a retainer clip adapted for rigid attachment to said vehicle body an surrounding said elastomeric bearing collar,
   a center bellows made of one of an elastomeric and a plastic material surrounding said steering rack and connected at a first end to said steering gear housing and at a second end to said bearing unit whereby said second end is secured between said guide bush and said bearing collar so that said second end, said clip, said bearing collar, and said guide bush are concentric, and
   as pair of tie rod means attached to opposite ends of said steering rack.

2. The rack and pinion steering gear recited in claim 1 and further including
   a first concertina bellows surrounding a first end of said steering rack and a first of said pair of tie rod means and having one end sealingly connected to said steering gear housing and the other end sealingly connected to said first tie rod means, and
   a second concertina bellows defined by a portion of said center bellows extending beyond said retainer clip of said bearing unit,
   said second concertina bellows surrounding a second end of said steering rack and a second of said pair of tie rod means and having a distal end sealingly connected to said second tie rod means.

* * * * *